United States Patent
Kraenzel et al.

(10) Patent No.: US 8,326,622 B2
(45) Date of Patent: Dec. 4, 2012

(54) DIALOG FILTERING FOR FILLING OUT A FORM

(75) Inventors: Carl Joseph Kraenzel, Boston, MA (US); David M. Lubensky, Brookfield, CT (US); Baiju Dhirajlal Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 12/236,183

(22) Filed: Sep. 23, 2008

(65) Prior Publication Data

US 2010/0076760 A1 Mar. 25, 2010

(51) Int. Cl.
G10L 15/00 (2006.01)
(52) U.S. Cl. ............... 704/235; 704/251; 369/25.01; 379/88.14
(58) Field of Classification Search .......... 704/235, 704/251; 369/25.01; 379/88.14
See application file for complete search history.

(56) References Cited

U.S. PATENT DOCUMENTS

| | | | |
|---|---|---|---|
| 6,718,313 B1 | 4/2004 | Lent et al. | |
| 6,816,468 B1 | 11/2004 | Cruickshank | |
| 6,816,858 B1 | 11/2004 | Coden et al. | |
| 6,961,700 B2 | 11/2005 | Mitchell et al. | |
| 7,146,321 B2 | 12/2006 | Cyr et al. | |
| 7,236,931 B2 | 6/2007 | He et al. | |
| 7,295,669 B1 | 11/2007 | Denton et al. | |
| 7,395,959 B2 * | 7/2008 | Kirkland et al. | 235/380 |
| 7,907,705 B1 * | 3/2011 | Huff et al. | 379/88.14 |
| 7,953,219 B2 * | 5/2011 | Freedman et al. | 379/265.06 |
| 2002/0111794 A1 * | 8/2002 | Yamamoto et al. | 704/200 |
| 2003/0050777 A1 * | 3/2003 | Walker, Jr. | 704/235 |

OTHER PUBLICATIONS

Metz, "Creating a Natural Language Call Router", IBM DeveloperWorks, Feb. 15, 2005.
David Attwater et al. "Practical Issues in the Application of Speech Technology to Network and Customer Service Applications", IEEE, Jun. 1998, pp. 185-190.

\* cited by examiner

*Primary Examiner* — Daniel D Abebe
(74) *Attorney, Agent, or Firm* — Schmeiser, Olsen & Watts; Anna Linne

(57) ABSTRACT

The invention discloses a system and method for filling out a form from a dialog between a caller and a call center agent. The caller and the caller center agent can have the dialog in the form of telephone conversation, instant messaging chat or email exchange. The system and method provides a list of named entities specific to the call center operation and uses a translation and transcription minor to filter relevant elements from the dialog between the caller and the call center agent. The relevant elements filtered from the dialog are subsequently displayed on the call center agent's computer screen to fill out application forms automatically or through drag and drop operations by the call center agent.

24 Claims, 4 Drawing Sheets

DIALOG FILTERING FOR FILLING OUT A FORM

FIELD OF THE INVENTION

The present invention relates generally to using electrical computer and digital processing systems and, more particularly, to filling out a software application form from a dialog via the telephone or online chat.

BACKGROUND OF THE INVENTION

A typical call center includes a number of agents (also referred to herein as representatives) who field inbound telephone calls and place outbound telephone calls. Call center telephone calls frequently have associated data, such as customer information and the details of customer requests. An agent may place outbound sales calls or receive inbound calls (such as 800 telephone numbers) from potential customers.

A conventional call center typically comprises either an Automatic Call Distributor (ACD) or Private Branch Exchange (PBX) apparatus which receives incoming calls through a Public Switched Telephone Network (PSTN) and routes the calls to a group of ACD agents having like skills. Specialized telephones, known as ACD/PBX feature phones, interface with a specific manufacturer's ACD/PBX and provide the agents with an array of advanced telephony functions.

Lately, call center agents increasingly interact with customers via online chats and emails in addition to telephone calls. It is not unusual for call center agents to be filling out application forms or taking down relevant information (also referred to herein as relevant elements) as a result of interacting with customers via telephone calls, online chats, or emails.

The conventional method of filling out application forms while interacting with customers via telephone calls, online chats or emails takes time and slows down the process. In order to write down the information a customer provides, a call center agent has to ask the caller to pause while typing. This not only increases the time agents have to spend on the phone, it also makes the calling experience less pleasant.

On the other hand, there exist commercial products that perform speech recognition and dialog management for customers to interact with a machine using a natural communication medium, namely speech. However, current commercial systems have limitations. The callers have to know the system. They cannot say anything they want and have the system understand their needs. Also, the commercial product does not provide a free dialog user interface, and the users are directed by the system as to what they can say at a particular state in the dialog. The responses are modeled by context-free grammars (CFGs) and hence the responses have to be in a specific format. Thus, fully automatic customer service telephone system has its own drawbacks. Customers are often frustrated while going through an automatic response system's seemingly endless options or when the automatic response system fails to recognize the customers' responses.

Cruickshank, in U.S. Pat. No. 6,816,468, describes a teleconferencing system, including apparatus and methods, for providing transcription and/or translation services during a teleconference. The disclosed teleconferencing system establishes a voice connection and a data connection with participants to the teleconference desiring transcription services. The speech of each participant to the teleconference is transcribed using voice recognition technology in real or near-real time. Additionally, the transcribed text may be translated into a participant's desired language. The translation may be generated in real or near-real time on a word-by-word basis or alternatively, on a phrase-by-phrase or sentence-by-sentence basis. The translated and transcribed text is displayed for a participant using the established data connection. The transcribed (and possibly translated) text may be displayed in real or near-real time during a participant's speech. Audio translation services are also provided to a participant using text-to-speech software to generate an audio signal from the translated and transcribed text.

Mitchell et al., in U.S. Pat. No. 6,961,700, describes a data processing apparatus for receiving recognition data from a speech recognition engine and its corresponding dictated audio data where the recognition data includes recognized words or characters. A display displays the recognized words or characters and the recognized words or characters are stored as a file together with the corresponding audio data. The recognized words or characters can be processed and link data is formed to link the position of the words or characters in the file and the position of the corresponding audio component in the audio data.

He et al., in U.S. Pat. No. 7,236,931, describes a system and method for automatic acoustic speaker adaptation in an automatic speech recognition assisted transcription system. Partial transcripts of audio files are generated by a transcriptionist. A topic language model is generated from the partial transcripts. The topic language model is interpolated with a general language model. Automatic speech recognition is performed on the audio files by a speech recognition engine using a speaker independent acoustic model and the interpolated language model to generate semi-literal transcripts of the audio files. The semi-literal transcripts are then used with the corresponding audio files to generate a speaker dependent acoustic model in an acoustic adaptation engine.

Cyr et al., in U.S. Pat. No. 7,146,321, describes a distributed speech recognition system which includes a speech processor linked to a plurality of speech recognition engines. The speech processor includes an input for receiving speech files from a plurality of users and storage means for storing the received speech files until such a time that they are forwarded to a selected speech recognition engine for processing. The speech processor further includes a dispatch system linked to the storage means for controlling the transmission of speech files to the plurality of speech recognition engines in a controlled manner.

Denton et al., in U.S. Pat. No. 7,295,669, describes a method and system for transferring telephone calls and data between computer programs in a call center. Flow connection modules associated with call center application programs allow data and telephone calls to be transferred from one computer program to another in the call center. The flow connection modules may be combined with a locator program such that the combination replaces the automatic call distributor (ACD) in a call center. The flow connection modules enable development of modular call centers, allowing the number of call center agent workstations to be easily increased or decreased. In operation, an application notifies its flow connection module that a call on a telephone in the workstation should be transferred to another application. The flow connection module establishes a data connection with a flow connection module associated with the other application.

Lent et al., in U.S. Pat. No. 6,718,313, describes a system and method for providing on line chat help to an applicant. An application identifier and a chat applet are inserted into a web page. The web page is sent to the applicant. The chat applet is configured to determine, based on an event, that the applicant could benefit from online chat and, upon such determination, to send a request to a chat server for a connection and to include the application identifier with the request.

Coden et al., in U.S. Pat. No. 6,816,858 B1, describes a system and method for performing Automatic Stream Analysis for Broadcast Information which takes speech audio as input, converts the audio stream into text using a speech recognition system, applies a variety of analyzers to the text stream to identify information elements, automatically generates queries from these information elements, and extracts data from search results that is relevant to a current program. The data is multiplexed into the broadcast signal and transmitted along with the original audio/video program. The system is fully automatic and operates in real time, allowing broadcasters to add relevant collateral information to live programming.

Metz, in *Creating a Natural Language Call Router, IBM developer Works*, Feb. 15, 2005, describes natural language call routers letting callers state in plain language their problems and be routed to the proper destination quickly and reliably. To accomplish call routing, two statistical models are created. The first performs speech recognition and is called a Statistical Language Model (SLM). The SLM tunes the speech recognition engines to the particular things the callers will say. By creating customized SLM based on what the callers are likely to say, the accuracy can be high without the typical lengthy per-user enrollment process that is typical of desktop dictation systems. The second model that needs to be created is called the Action Classifier (AC) model. The AC model takes the spoken request obtained by the speech engines and predicts the correct action to take. Actions are the categories into which each request a caller makes can be sorted. The two models are deployed inside a call routing application, a Web project preconfigured to use the call routing models. The two models figure out what a caller wants to do, and the call routing application defines where to route the caller for each action. Typically, each action routes to an extension in an organization's call center or an Interactive Voice Response (IVR) software program.

Automatic speech recognition has been a research area for 30 years. Significant improvements have been made in computational speeds and speech recognition technology to make it an interesting area of business as well. The main goal in speech recognition is to have a machine recognize what word is being spoken by an arbitrary person. Applications range from desktop dictation, various telephony applications, such as voice portals, directory dialers to embedded speech recognition applications, such as command and control in a car. Initially, studies were done on limited vocabulary isolated speech recognition. However, recently large vocabulary continuous speech recognition systems have been developed and are being made commercially available by several companies.

Despite these developments, customers still have to either interact with an automatic response unit which does not always understand what the customers are saying, or wait in line to talk to an agent and wait for the agent to manually record relevant information the customers provide.

Thus, there is a need for improved methods and systems that address the above problems, as well as others.

SUMMARY OF THE INVENTION

The forgoing and other problems are overcome by methods and apparatus in accordance with embodiments of this invention.

While fully automatic customer service telephone systems are cost effective, they are often ineffective in assisting customers. On the other hand, full human customer service operation is costly and time consuming for both customers and customers service providers. It is thus desirable to combine both an automatic mechanism of effectively capturing relevant elements of a conversation, the convenience and flexibility of talking to a customer service agent and the efficiency of transforming the captured relevant elements into applications forms used by agents to either collect data or provide solutions for customers' requests.

The present invention provides a method and system for filling out a software application form (also referred to herein as an application form or a form) from a dialog. In other words, the present invention provides an effective mechanism for combining a fully automatic customer service telephone system with full human interaction customer service operation. Such effective combination does not exist in any known system and will both greatly enhance customer experience and significantly reduce cost for customer service providers.

The present invention has four main elements. First, the invention provides a list of named entities specific to any particular call center operation. Second, the invention parses the interactions between call center agents and the customers and separated relevant elements (also referred to herein as separated elements) from the interactions based on the list of named entities. Third, the separated relevant elements will be on display on the computer screen of the call center agent. Finally, the call center agent will perform drag and drop to fill out relevant application forms with the separated relevant elements.

Methods, systems, and devices are provided for a call center agent to fill out a form from a dialog. In one embodiment of the present invention, there is provided a system for filling out a form from a dialog, comprising: a) a dialog having elements relevant for filing out the form; b) a list of named entities; c) a device for separating the elements from the dialog using the list of named entities; d) a computer screen display of the separated elements and the form; and e) a command control for transferring the separated elements on the computer screen display to fill the form on the computer screen display.

In another embodiment of the present invention, there is provided a method for filling out a form from a dialog, comprising the steps of: a) providing a dialog having elements relevant for filing out the form; b) providing a list of named entities; c) separating the elements from the dialog using the list of named entities; d) displaying the separated elements and the form on a computer screen display; and e) transferring the separated elements to fill out the form on the computer screen display.

In yet another embodiment of the present invention, there is provided a computer program embodied on a computer-readable medium for filling out a form from a dialog, comprising: a) first program instruction steps for providing a dialog having elements relevant for filing out the form; b) second program instruction steps for providing a list of named entities; c) third program instruction steps for separating the elements from the dialog using said list of named entities; d) fourth program instruction steps for displaying the separated elements and the form on a computer screen display; and e) fifth program instruction steps for transferring the separated elements to fill out the form on the computer screen display, and wherein all the program instruction steps are recorded on the medium.

An embodiment of the present invention is directed to a method for deploying a computer program for filling out a form from a dialog, to a client company, comprising the steps of: recording on a computer readable medium program instruction steps for providing a dialog having elements relevant for filing out the form, providing a list of named entities, separating the elements from the dialog using the list of named entities, displaying the separated elements and the form on a computer screen display, and transferring the separated elements to fill out the form on the computer screen display installing the program instruction steps from the medium onto a computer processor at the client company, and training employees of the client company to run the program instruction steps.

BRIEF DESCRIPTION OF THE DRAWINGS

These and other features of the methods, systems and devices for filling out a form from a dialog will be more readily understood from the following detailed description of the various aspects of the embodiments taken in conjunction with the accompanying drawings in which.

Figure 1:
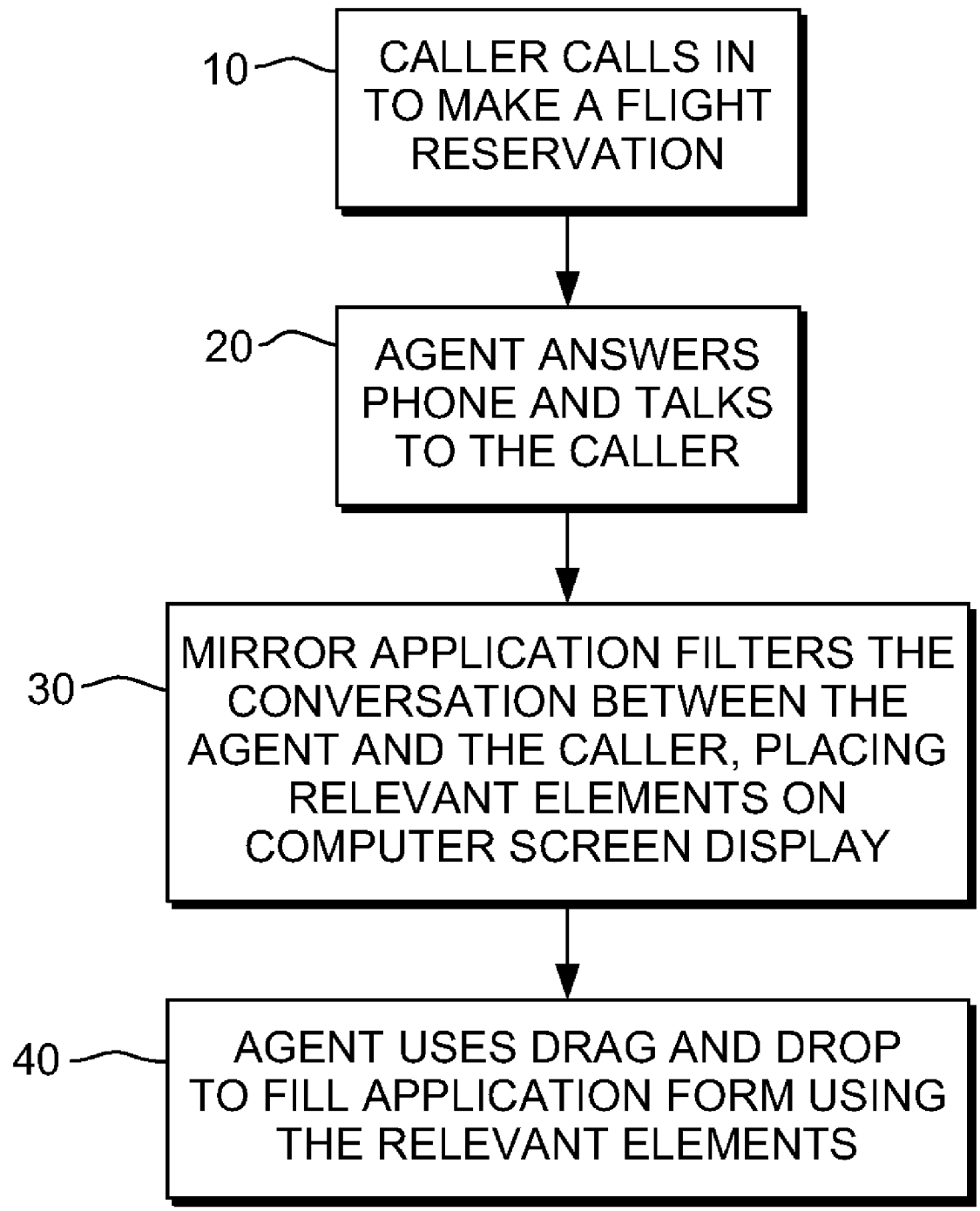
FIG. 1 is a flow chart depicting a method for filling out a form from a dialog.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides a list of named entities specific to any particular call center operation. To arrive at the list of named entities, training data were collected from calls made to the customer service providers, as well as generic telephony data from various domains. Since the domain-specific speech recognition is required to recognize terms not necessarily contained in the training data, it was necessary to add generic telephony data to increase coverage of the acoustic model for all possible scenarios.

The method to provide the list of named entities is similar to the method provided by the IBM travel reservation system, see Hakan Erdogan, *Speech Recognition for a Travel Reservation System*, Sabanci University Online Publishing. In its language model for the travel reservation system, the IBM travel reservation system has 42 language model classes representing cities, states, airports, airlines, months, years, days in a month, hours, minutes, days of the week, as well as some other classes.

As an example, the IBM travel reservation system has used compound words to overcome the problem with the language model classes [city] and [state]. It glues together the word sequences corresponding to "[city] [state]" allowing only the correct combination such as "DALLAS TEXAS" or "LOS ANGELES CALIFORNIA". These compound words are then put in a language model class of their own [city state] to increase coverage. This method helps reduce the word error rate (WER) significantly. The error corrections are at important places for the language understanding and major errors in city names can be avoided using this method. Similarly, the system glues together "[city] [airport]" pairs such as "NEW YORK LA GUARDIA" to aid in recognition as well. These are put in a language model class of their own as well.

The IBM travel reservation system also has other compound words that were formed by choosing a subset of the word sequences. These include compounds like "I WOULD LIKE TO FLY", "THAT'S O.K." and many others.

The IBM travel reservation system has dialog states in the system corresponding to departure and arrival dates and times, departure and arrival city, airline and conformations. To use this information, the system builds language models trained from user responses recorded at a specific state. The system interpolates these language models with the base language model to obtain a different language model for each state. In addition, the travel reservation system places grammar which contains expressions such as "FROM [city] TO [city]", as well as "FROM [city]" and "TO [city]" for all cities. It also designs for dates and times to capture expressions such as "MONDAY SEPTEMBER THIRD TWO THOUSAND ONE" and "TEN A.M. IN THE MORNING" and many more. The probabilities for paths in the grammars were assigned using common sense.

A possible parsing of a travel domain sentence is shown:

I WANT TO FLY {FROM NEW YORK} place {NEXT TUESDAY} date {IN THE MORNING} time

Here, place, date, and time are named entities. As described above, each named entity has its possible responses and their likely formats.

When a call center agent talks to a customer over the phone, the dialog will be transcribed by a translation and transcription minor which includes speech recognition software. The system then uses the list of pre-defined named entities to identify relevant elements. These relevant elements are stored for the session and appear on the call center agent's desktop ready for the call center agent to use drag-and-drop to fill an application form with the relevant elements.

Alternatively, the call center agent interacts with the customer through instant messaging or by email. The text of the instant messaging or email is parsed in the same manner as the transcribed text of a telephone conversation. In addition, the transcribed text and the text of the instant messaging or email will first be processed using a spell check component, which is adapted for making spelling or contextual corrections. Further, both the transcribed text from a telephone conversation and the text of the instant messaging or email can be processed by a translation engine.

FIG. 1 is a flow chart depicting a method for filling out a form from a dialog, in accordance with one embodiment of the present invention. The method may be implemented by execution of program code on a processor of a computer system, such as the system depicted in FIG. 4 and described in the following paragraphs. The program code executable on the processor of the computer system may be stored in a computer readable medium that is not a signal. A computer program product comprises the computer readable medium having the program code stored therein.

In Step 10, a caller 41 calls into a call center to talk to a call center agent 47 via the Public Switched Telephone Network (PSTN) to make an airline reservation. Optionally, Voice over IP (VoIP) or other telephone networks may also be used.

In Step 20, an agent answers the telephone to talk to the caller associated with the call via the PBX 43 and ACD 44. The PBX 43 connects the call via a CTI interface to the translation and transcription mirror system 45.

Figure 2:
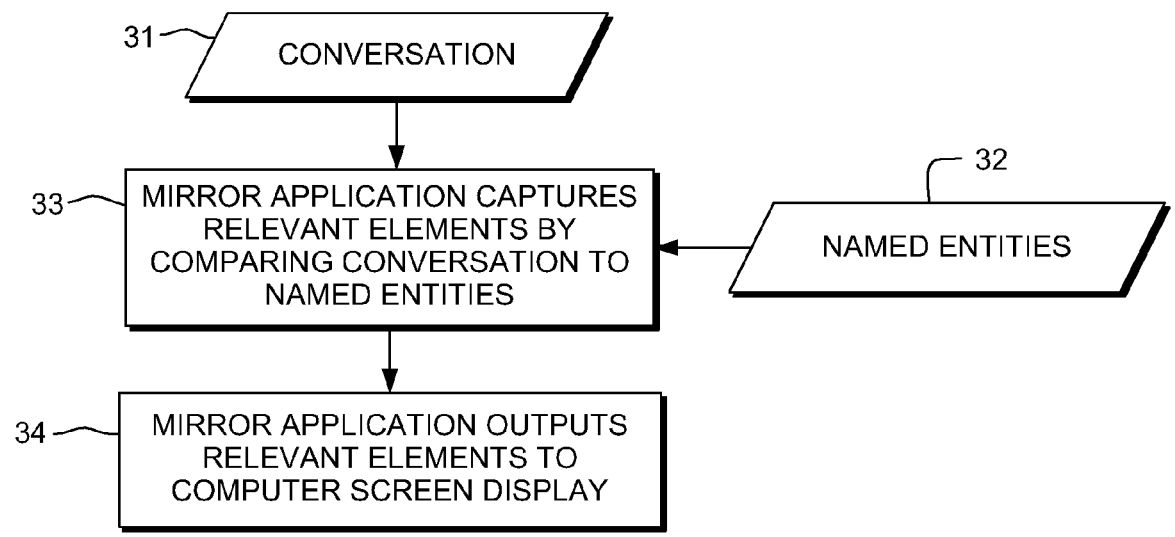
FIG. 2 is a detailed flow chart depicting a mirror application capturing relevant elements by comparing conversation to named entities.

Step 30 provides a minor application to filter the conversation 31 (see FIG. 2) between the agent and the caller, and to place relevant elements on the agent's computer screen display. The conversation 31 is a dialog which may be a telephone conversation, a message transmitted via instant messaging, or an email. In step 40, the agent uses drag and drop to fill out the application form on the agent's computer screen display, using the relevant elements on the agent's computer screen display. FIG. 2 describes the steps performed by the transcription mirror system. In processing the conversation 31 (i.e., the dialog), the translation and transcription minor 45 (see FIG. 4) uses technology termed as natural language speech recognition to convert the speech to text if the dialog is a telephone conversation and performs step 33 to identify the relevant entities in the dialog, by having the minor application separate the relevant elements from the dialog by comparing the dialog to the named entities 32 in the list of named entities. The minor application displays the separated elements and the form on the computer screen display in step 34 using the application system 46 depicted in FIG. 4.

Figure 3:
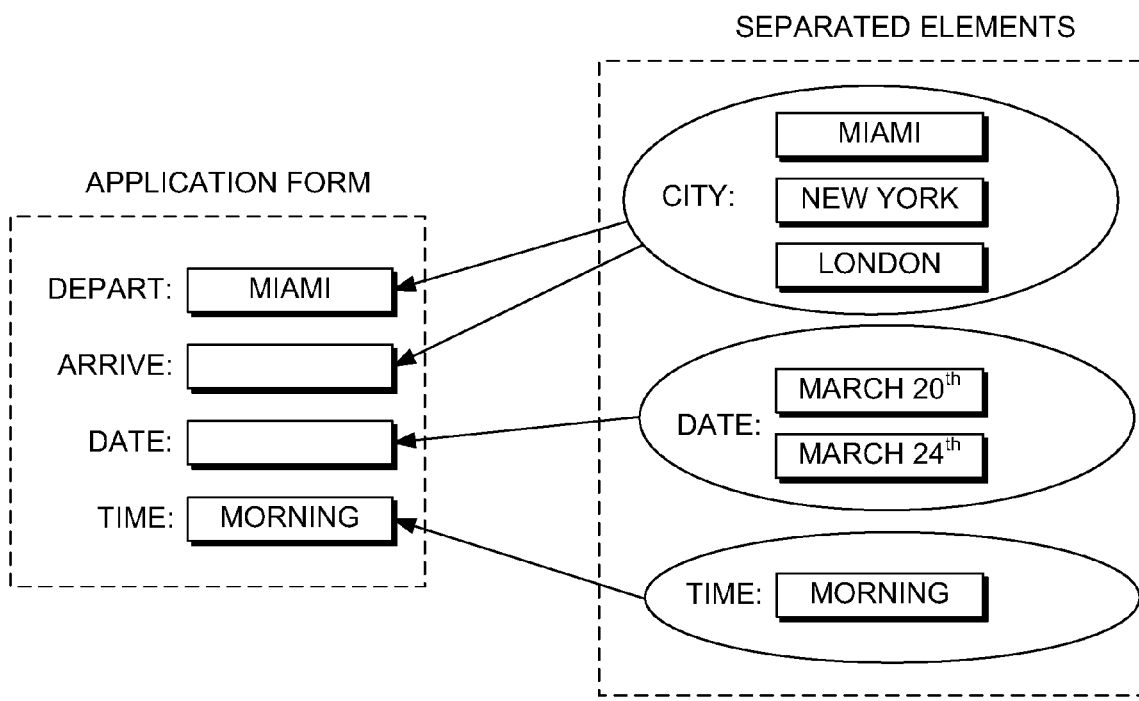
FIG. 3 illustrates application of the present invention in a call center for flight reservations.

FIG. 3 shows a typical application screen where the agent can take the separated relevant elements in the minor information to copy into the application form to allow the speed up of the process of entering the caller's request.

The translation and transcription mirror system 45 can also optionally perform language translation on the dialog when the agent and the caller do not speak the same language. The application screen in FIG. 3 can display translated mirror information.

Figure 4:
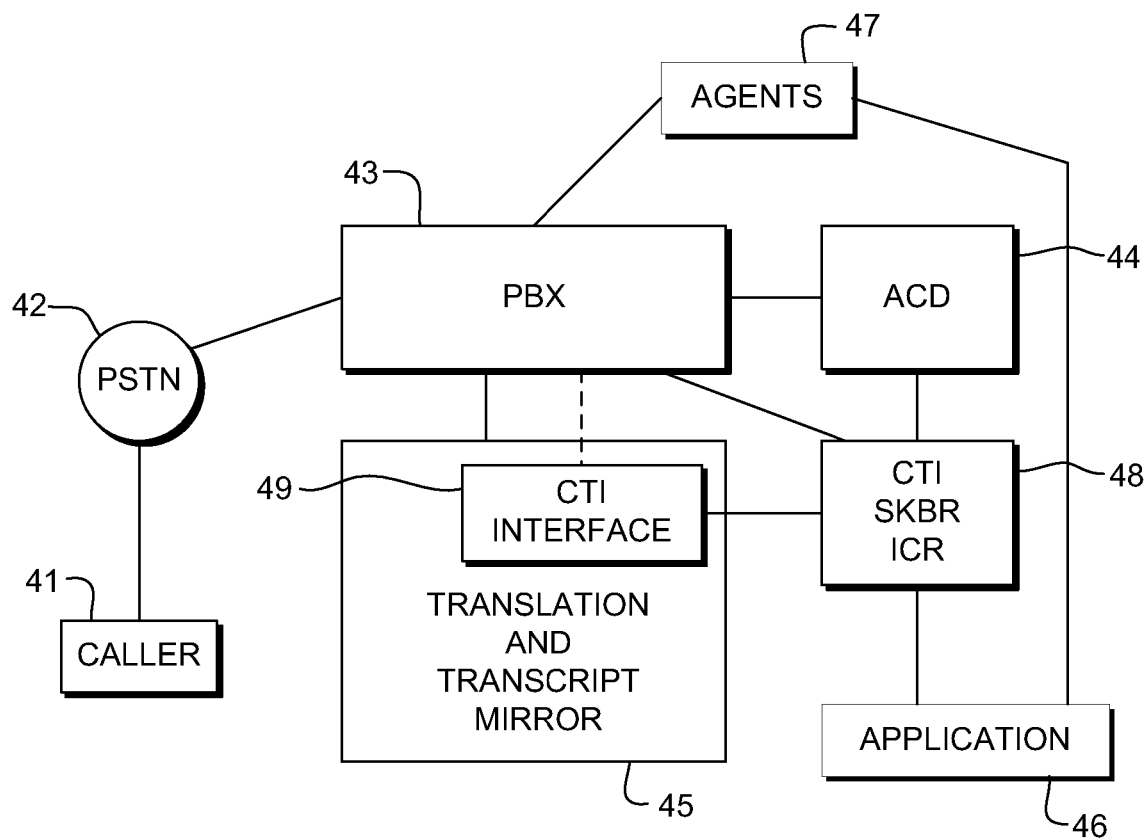
FIG. 4 depicts a system diagram for the present invention.

FIG. 4 is a system diagram for an embodiment of the present invention. Caller 41 places a call which goes through Public Switched Telephone Network (PSTN) 42. The call then goes through Private Branch Exchange (PBX) 43 to the call center where an agent 47 picks up. While the agent speaks to the caller, the conversation is being captured by the translation and transcription minor 45 which has a Computer Telephony Integration (CTI) interface 49. A CTI interface is a telephony resource that creates a portal through which interoperable telephony components communicate with one another. A CTI interface operates by generating, sending, receiving, and interpreting messages containing status information and requests for services to be performed. There is a logical link between the transcription minor 45 and the PBX 43 via the CTI interface 49.

PBX 43 connects to Automatic Call Distributor (ACD) 44. The Computer Telephony Integration/Skill Based Routing/ Intelligent Call Routing (CTI/SKBR/ICR) system 48 identifies relevant elements in the conversation based on named entities with Caller 41, and allows mirror information in the form of relevant elements to be displayed on the computer screen of the agent handling that specific call. In other words, relevant elements of the conversation are filtered based on the named entities. Once the mirror information with relevant elements are displayed on the agent's computer screen, the relevant elements can be used to either automatically fill out application form for the agent or the agent can use drag and drop function of the computer mouse to fill out the application form.

What is claimed is:

1. A computer system, comprising a processor and a computer readable medium storing program code configured to be executed by the processor to implement a method for filling out a form from a dialog, said method comprising:
    said processor providing a dialog having elements relevant for filing out said form;
    said processor providing a list of named entities;
    said processor separating said elements from said dialog using said list of named entities;
    said processor displaying the separated elements and said form on a computer display screen; and
    said processor transferring the separated elements to fill said form on said computer screen display.

2. The computer system of claim 1, wherein said dialog is in the form of instant messaging.

3. The computer system of claim 1, wherein said dialog is a telephone conversation.

4. The computer system of claim 1, wherein said device for separating said elements comprises speech recognition software.

5. The computer system of claim 1, wherein said transferring is implemented using a command control.

6. The computer system of claim 1, wherein the method further comprises:
    said processor generating the list of named entities from training data collected from telephone calls made to customer service providers and from generic telephony data pertinent to different domains.

7. The computer system of claim 1, wherein the list of named entities consists of the named entities.

8. A method for filling out a form from a dialog, comprising the steps of:
    providing a dialog having elements relevant for filing out said form;
    providing a list of named entities;
    separating said elements from said dialog using said list of named entities;
    displaying the separated elements and said form on a computer screen display; and
    transferring the separated elements to fill out said form on said computer screen display.

9. The method of claim 8, wherein said dialog is in the form of instant messaging.

10. The method of claim 8, wherein said dialog is a telephone conversation.

11. The method of claim 8, wherein said elements are separated using speech recognition software.

12. The method of claim 8, wherein the separated elements on said computer screen are transferred using a command control.

13. The method of claim 8,
    wherein a processor of a computer system performs said providing the dialog, said providing the list of named entities, said separating, said displaying, and said transferring, and
    wherein the method further comprises:
        said processor generating the list of named entities from training data collected from telephone calls made to customer service providers and from generic telephony data pertinent to different domains.

14. The method of claim 8, wherein the list of named entities consists of the named entities.

15. A computer program medium having program code stored therein, said medium not being a signal, said program code configured to be executed by processor of a computer system to implement a method for filling out a form from a dialog, said method comprising:
    said processor providing a dialog having elements relevant for filing out said form;
    said processor providing a list of named entities;
    said processor separating said elements from said dialog using said list of named entities;
    said processor displaying the separated elements and said form on a computer screen display; and
    said processor transferring the separated elements to fill out said form on said computer screen display.

16. The computer program of claim 15, wherein said dialog is in the form of instant messaging.

17. The computer program of claim 15, wherein said dialog is a telephone conversation.

18. The computer program of claim 15, wherein said elements are separated using speech recognition software.

19. The computer program of claim 15, wherein said transferring is implemented using a command control.

20. The computer program product of claim 15, wherein the method further comprises:

said processor generating the list of named entities from training data collected from telephone calls made to customer service providers and from generic telephony data pertinent to different domains.

21. The computer program product of claim 15, wherein the list of named entities consists of the named entities.

22. A process, comprising deploying a program code to a client company, said program code configured to be executed by a processor of a computer system at the client company to perform a method for filling out a form from a dialog, said deploying comprising:

recording the program code on a computer readable medium, said method performed by execution of the program code comprising:

said processor providing a dialog having elements relevant for filing out said form;

said processor providing a list of named entities;

said processor separating said elements from said dialog using said list of named entities;

said processor displaying the separated elements and said form on a computer screen display; and said processor transferring the separated elements to fill out said form on said computer screen display;

installing said program code on the computer system by transferring said program code from said medium to the computer system; and training employees of said client company to run said program code on the computer system.

23. The process of claim 22, wherein the method comprises generating the list of named entities from training data collected from telephone calls made to customer service providers and from generic telephony data pertinent to different domains.

24. The process of claim 22, wherein the list of named entities consists of the named entities.

* * * * *